Feb. 17, 1959 W. H. SCHYMIK 2,874,207
WELDED ISOLATED PHASE BUS
Filed March 9, 1955 3 Sheets-Sheet 1
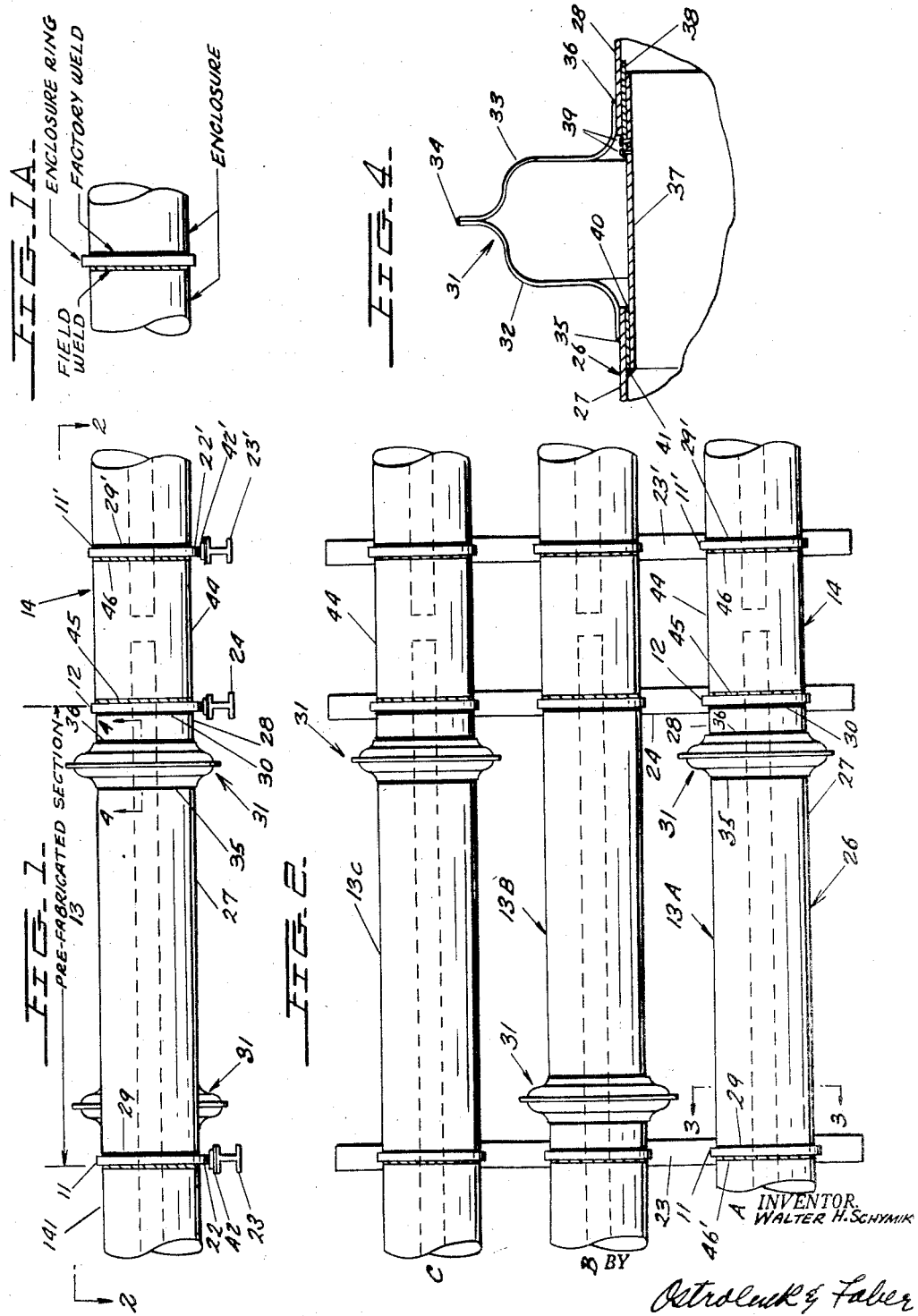
INVENTOR.
WALTER H. SCHYMIK
BY
Ostrolenk & Faber
ATTORNEYS Feb. 17, 1959  W. H. SCHYMIK  2,874,207
WELDED ISOLATED PHASE BUS
Filed March 9, 1955  3 Sheets-Sheet 2
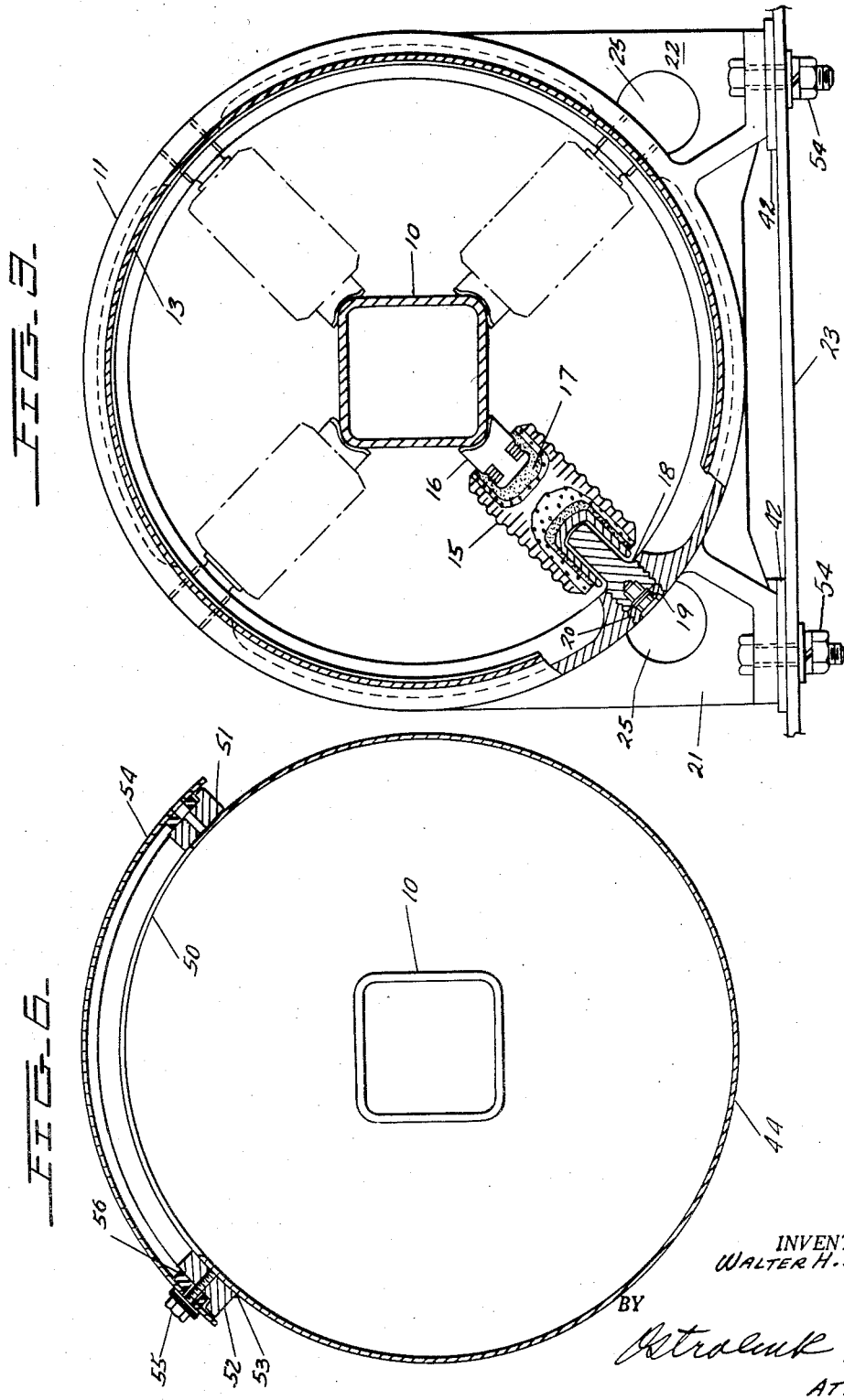
INVENTOR.
WALTER H. SCHYMIK
BY
*Ostrolenk & Faber*
ATTORNEYS Feb. 17, 1959 W. H. SCHYMIK 2,874,207
WELDED ISOLATED PHASE BUS
Filed March 9, 1955 3 Sheets-Sheet 3
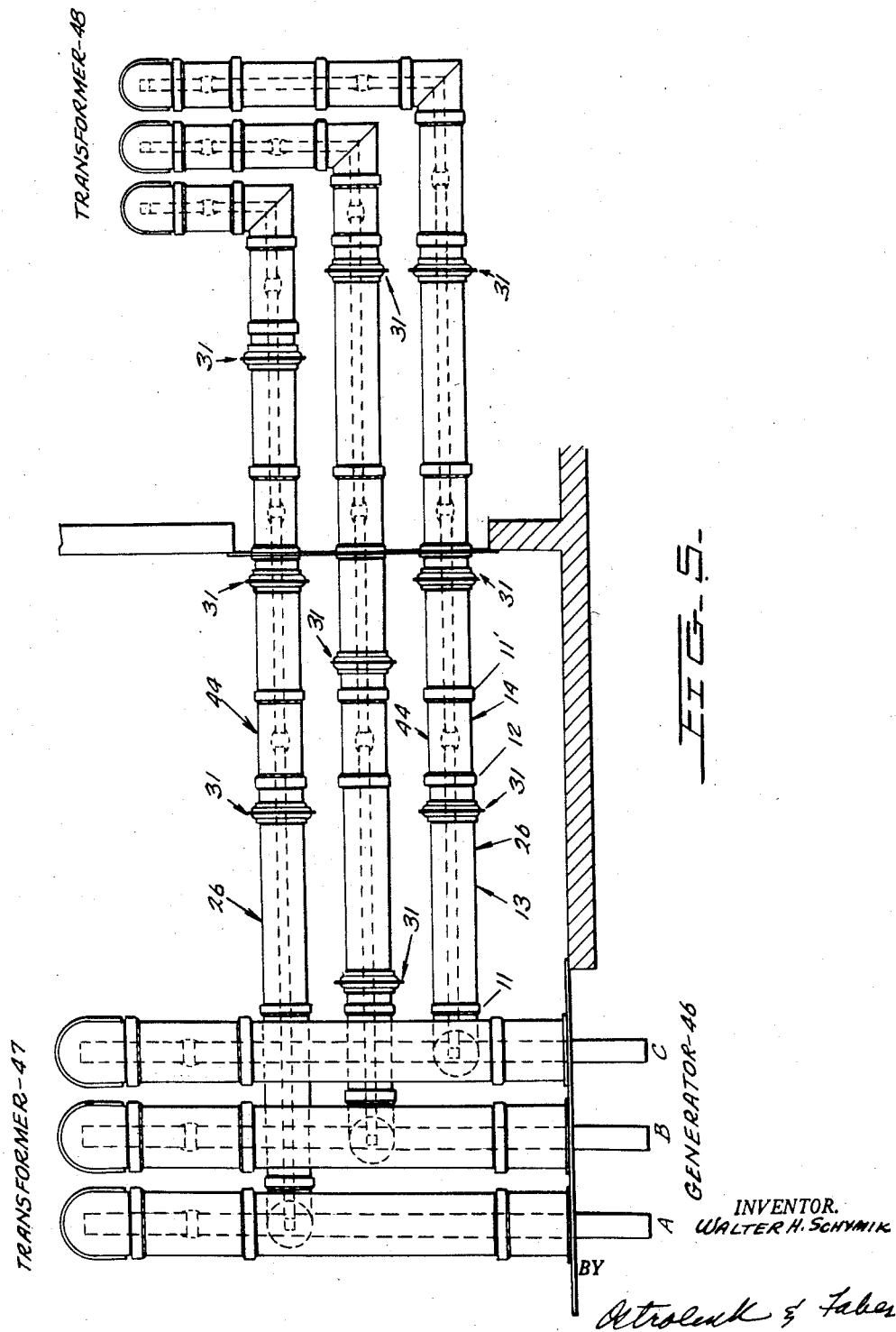
INVENTOR.
WALTER H. SCHYMIK
BY
Ostrolenk & Faber
ATTORNEYS

United States Patent Office 2,874,207
Patented Feb. 17, 1959

2,874,207

WELDED ISOLATED PHASE BUS

Walter H. Schymik, Oreland, Pa., assignor to I-T-E Circuit Breaker Company, Philadelphia, Pa., a corporation of Pennsylvania Application March 9, 1955, Serial No. 493,175

3 Claims. (Cl. 174—99)

This invention relates to isolated phase bus bars and more particularly is directed to a novel structural arrangement wherein a water-tight structure is achieved by welding all of the sections of the isolated phase bus run and thereby eliminating the necessity of gasketing.

In the distribution of electrical energy for large current and voltage magnitudes, it becomes feasible and necessary to provide an isolated phase bus structure wherein each of the conductors is surrounded by a metallic housing and physically separated from the other phases a sufficient distance to provide necessary dielectric protection as well as reduce the detrimental effects of the magnetic force on the occurrence of a short-circuit current.

Isolated phase bus structures to which my instant invention is directed are shown in U. S. Patents 2,275,203, 2,293,310, 2,335,543 and Reissue 23,811.

In the operation of isolated phase bus systems, it is also necessary to enclose the bus to keep dust and moisture off the supporting insulators so that there will not be a short-circuit from the bus to the enclosure.

The problem of properly enclosing the bus and insulator is particularly important in hot and humid climate areas where there may be an appreciable degree of moisture or condensation around the housing or enclosures.

Heretofore, bus structures have been designed which have water-tight characteristics. In the main, these bus structures are provided with elaborate gasketing means to seal out the moisture. However, even though structures can be constructed at the factory so that they are substantially water-proof, it is possible that during the installation of these elaborate structures that a misaligning defective gasket or improper installation will so modify the design gasketing arrangement that the system is no longer water-proof.

With my present arrangement, I have provided an isolated phase bus wherein a major portion of the system is welded at the factory. The sections are then shipped to the point of installation and there field welds properly secure all of the sections together totally sealing off the bus and insulator.

Since all of the welded sections are welded together after they have been mounted on their appropriate supports, there can be no possibility of leakage as a result of misalignment or improper gasketing. That is, since the final isolated phase bus system is entirely welded together, the entire system will be water-tight.

It will be noted that by providing a welded system, the normal expansion or contraction will not be compensated for at the telescoping sections where the gasketing was heretofore applied. Hence, in order to overcome this problem, I have provided a bellows arrangement spaced along the enclosure to provide a proper compensation for expansion and contraction of the enclosure.

A stiffener piece is provided to add the necessary rigidity and reinforcement to the enclosure and to relieve the bellows of mechanical strain.

An insulation member is positioned between the stiffener piece and the enclosure to prevent circulation of current through the bellows and thereby prevent heating up at this point.

In the manufacture of isolated phase bus structures, it is not only essential that the completed system be water-tight, but it is also necessary to design the structures so that a major portion of the assembly can be completed at the factory. That is, it is desirable to provide prefabricated sections so that these sections can in turn be shipped from the factory to the field and there installed with as little possibility of error as possible with as much ease as possible.

In my invention, I have provided a novel arrangement wherein sections can be prefabricated at the plant by factory welding a plurality of these prefabricated sections shipped to the field or point of installation where field welds are used to couple the prefabricated sections together by enclosure units.

Circulating currents between adjacent enclosures are eliminated by means of insulating the supporting ring from the main cross supporting members and also providing insulation at each end of the enclosure where the enclosures tie into any common wall plate or transformer throat.

Grounding of the enclosure is accomplished by tying three sets of enclosures together with the grounding bus positioned approximately in the center of the bus run. Since the enclosures are completely welded together and insulated from any other of the supporting structures, no additional grounding grid is necessary.

Accordingly, a primary object of my invention is to provide a novel isolated phase bus system wherein the final structure of the enclosure for the bus run is welded together thereby eliminating the necessity of gasket means.

Another object of my invention is the provision of an isolated phase bus system wherein a water-tight structure is provided regardless of a misalignment which may exist during the installation of the bus structure.

A still further object of my invention is to provide an enclosure for an isolated phase bus wherein all sections of the enclosure are welded together and do not require gasket means.

Another object of my invention is to provide a welded enclosure for an isolated phase bus wherein bellows means are periodically spaced along the enclosure to provide adequate compensation for expansion and contraction of the enclosure.

Another object of my invention is to provide a novel arrangement wherein a bellows means is provided to compensate for the expansion and contraction of the enclosure with adequate stiffening means provided to give the rigidity and reinforcement required for the enclosure and to relieve the bellows of mechanical strain.

A still further object of my invention is to provide a welded enclosed isolated phase bus with bellows for compensation of expansion and contraction with additional means to prevent the circulation of current through the bellows thereby eliminating the possibility of undue heat existing in this unit.

Another object of my invention is to provide a novel isolated phase bus structure in which parts can be prefabricated at the factory by means of factory welds wherein the prefabricated sections are shipped to the field and assembled into a completed unit by a minimum number of welds.

These and other objects of my invention will be apparent from the following description when taken in connection with the drawings in which:

Figure 1 is a side view of one phase of an isolated phase bus run and illustrates the manner in which my invention is carried out.

Figure 1a illustrates the legends which are used in connection with Figures 1, 2, 4 and 5 so that factory welds can readily be distinguished from the field welds.

Figure 2 is a plan view of Figure 1 taken in the direction of the arrows 2—2 of Figure 1 and illustrates the manner in which my novel enclosures are positioned with respect to each other on cross-supporting members.

Figure 3 is a view taken in the direction of the arrows 3—3 of Figure 2 and illustrates the manner in which the bus is supported by a plurality of insulators which, in turn, are supported by an enclosure ring.

Figure 4 is a view taken in the direction of the arrows 4—4 of Figure 1 and illustrates the construction of the bellows arrangement used in my invention, the manner in which the stiffener piece is added to relieve the bellows of mechanical strain and also illustrates the manner in which circulating currents are prevented from flowing in the bellows.

Figure 5 is a plan view of an outdoor buswork and illustrates a typical installation in which my welded isolated phase bus can be applied.

Figure 6 illustrates a modification which may be applied to my instant invention. This figure is a cross-sectional view of the enclosure located adjacent to the supporting insulators and illustrates an end hole which may be utilized for the enclosure for rapid inspection or repair of the insulators.

The isolated phase bus structure shown in Figures 1, 2, 3, 4 and 5 is provided for the busbars 10 which conduct magnitudes of currents which are in the thousands of amperes.

In the plan view of Figure 2, there is shown a portion of three phases A, B and C of an isolated phase bus structure. Each phase has substantially the same structural arrangement and hence, the description will be given in connection with phase A which is shown in the side view of Figure 1.

In spaced parallel relation along the axis of the bus bar 10, there is positioned a plurality of supporting rings 11 and 12. As will hereinafter be more apparent, the structure sections 13 and 14 for each phase will be repeated along the axis of the busbar 10. Hence, the numerals identified with sections 13 and 14 are identified with primes to indicate that the identical type of section is repeated along the axis of the busbar.

As best seen in Figure 3, a plurality of insulators 15 are positioned in the clamp of a supporting ring 11. It will be noted that the description given in connection with the supporting ring 11 of Figure 3 will also apply to the supporting ring 12. A saddle 16 is secured to one end of the insulator by means of the cement 17 to secure the conductor 10 in place.

An adjusting stud 18 having an adjusting stud lock nut 19 is cemented into the opposite end of the insulator. The adjusting stud 18 is threadably secured in an appropriate opening 20 in the ring 12. The relative radial position of the insulator 15 can then be adjusted by means of the adjusting stud 18 and locked by lock nut 19. Thus, forces created by the magnetic stresses will pass through the insulator to the ring 11.

It will be noted that in the arrangement of Figure 3, I have merely shown one preferred arrangement whereby the bus 10 can be supported on the ring through a plurality of insulators. However, it will be apparent to those skilled in the art that there are many other equivalent methods for supporting the bus with either one, two, three or four insulators and I have merely shown a preferred method for such. The ring 12 is provided with feet portions 21 and 22 which, in turn, are secured to the cross-supporting members 23 and 24.

The feet 21 and 22 are provided with openings 25 and 26 so that access may be had to the adjusting stud 18 and lock nut 19 for adjusting the radial position of the insulators 15.

As best seen in Figures 1 and 2, the prefabricated section 13 is comprised of a first supporting ring 11 and a second supporting ring 12 which are substantially as described in connection with Figure 3.

An enclosure section 26 is positioned between adjacent supporting rings 11 and 12. The enclosure 26 may be either a tubular or square cross-section member. If it is desired to construct the enclosure 26 of two half sections, then these sections will have a factory longitudinal weld so that they will completely enclose the bus. However, if the enclosure is initially made of a single hollow tubular member, it is apparent that no longitudinal welding will be necessary.

Prior to the time that the bus 10 is mounted and secured within the supporting rings 11 and 12, as shown in Figure 3, the enclosure 26 is properly secured to the supporting rings 11 and 12. That is, the enclosure 26 is made up of a first portion 27 and a second portion 28. The first portion 27 has a continuous factory weld 29 along the circumference of one end to thereby rigidly secure it to a flange of the supporting ring 11. The second portion 28 of the enclosure 26 also has one end secured to the ring 12 by means of a continuous factory weld 30. The first and second portion 27 and 28 of the enclosure 26 are coupled together by means of the bellows 31.

The bellows 31 is preferably made of a sheet aluminum and is provided to give the desired compensation within the bus structure for expansion and contraction of the sections 13 and 14. As best seen in Figure 4, the bellows 31 is comprised of a first portion 32 and a second portion 33 which are welded together by a continuous factory weld 34. The portion 32 of the bellows 31 has a continuous factory weld 35 between it and the first portion 27 of the enclosure 26.

In like manner, the second portion 33 of the bellows 31 is secured to the second portion 28 of the enclosure 26 by means of continuous factory weld 36. Thus, the bellows 31 provides a flexible coupling between the first portion 27 and the second portion 28 of the enclosure 26.

Since the bellows 31 is constructed to be flexible for the purpose of compensation, it is desirable to add additional means to provide the necessary rigidity and reinforcement for the enclosure. This is provided by means of a stiffener piece 37 which has the same general configuration as the enclosure 26.

As best seen in the sectional enlarged view of Figure 4, the stiffener piece 37 is positioned on the interior of the enclosure section of the enclosure 26.

Insulation member 38 also having the same general configuration as both the stiffener piece 37 and the portions 27 and 28 of the enclosure 26 is secured to one end of the stiffener piece 37 in any desirable manner as for example by means of the rivets 39. The insulation member 38 may be of any desirable insulating material, such as hard bone fibre, and is of sufficient length to overlap both the end of the stiffener piece 37 and the second portion 28 of the enclosure 26. The opposite end of the stiffener piece 37 is provided with a metallic member 40 which is the same general configuration as the insulation piece 38.

The piece 40 merely serves as a filler to compensate for the space taken up by the insulation member 38. The filler 40 and stiffener piece 37 are then secured to the first portion 27 of the enclosure 26 by means of the factory weld 41. Thus, with the arrangement shown in Figure 4, the stiffener piece adds the necessary rigidity and reinforcement to the first and second sections 27 and 28 of the enclosure 26 and will also relieve the bellows 31 of mechanical strain.

It will be noted that the insulation member 38 is not physically connected to the second portion 28 of the enclosure 26. That is, there is no physical connection between stiffener piece 37 and second portion 28. As a result thereof, there will be a sliding connection between these two members so that bellows 31 can permit relative movement of the first section 27 with respect to the second section 28 during expansion and contraction of the bus structure.

Since there will be some eddy currents flowing in the enclosure of the isolated phase bus structure, it is necessary to provide means to prevent circulation of current through the bellows 31 and stiffener member 37 so that the bellows 31 will not over-heat. The insulation member 38 stops the circulation of current through the bellows 31 and hence, this unit will not over-heat.

It will therefore be apparent from the above that the section 13, with or without the bus 10 or insulators 15, can be pre-fabricated at the factory. That is, the section 13 including the first and second ring 11 and 12 as well as the first and second portion 27 and 28 of the enclosure 26 along with the bellows 31 can be pre-assembled at the factory by means of the continuous factory weld 29, 30, 35, and 36.

A plurality of these sections may then be shipped to the field or point of installation. At that time, the bus 10 and the insulators 15 for the support thereof can be readily and easily positioned within the prefabricated sections 13.

The sections 13 are then mounted at the point of installation on the cross-supporting members 23 and 24. In order to prevent circulation of currents between adjacent enclosures, alternate rings 12 are grounded and the other alternate rings 11 are insulated from the cross-supporting member. Thus, for example, the rings 11, 11' are provided with appropriate insulation 42, 42' between the cross-supporting member 23. Thus, as best seen in the enlarged view of Figure 3, the feet 21 and 22 of the ring 11 have insulation 42 sandwiched between them and the beam or cross-supporting member 23.

The ring 11 is rigidly secured to the supporting member 23 by bolts 54. Bolts 54 may be provided with means such as insulating tubing, or the bolts may be of insulating material to prevent current from flowing from ring 11 through bolts 54 to the cross-supporting member 23. Thus, as shown in the plan view of Figure 2, all of the supporting rings 11 associated with phases A, B and C will be insulated from the cross-supporting member 23 in the manner shown in Figures 1 and 3. The remaining alternate supporting rings 12 will be electrically connected to the cross-supporting member 24 which, in turn, is electrically connected through a grounding bus located approximately in the center of the run.

Thus, the insulation provided for the alternate rings 11 prevents circulation of current through the enclosures from one phase to the other and the grounding of the alternate supporting rings 12 provides the required safety so that the enclosures will be at ground potential.

After the prefabricated sections 13 are appropriately mounted and secured to the cross-supporting members 23 and 24, the bus 10 is mounted within the enclosure by means of the supporting insulators 15 in the manner described in connection with Figure 3.

At this time, the enclosures 44 are positioned between the adjacent prefabricated sections 13. The enclosure 44 may have substantially the same configuration as the enclosure sections 26 and are positioned concentric to the bus 10.

It will also be noted that the enclosure 44 may either be made of a hollow tubular member having a continuous circumference or which may be made of two half sections which are welded longitudinally.

One end of the enclosure 44 will be secured to the ring 12 by a continuous field weld 45 and the other end of the enclosure 44 will be secured to the supporting ring 11 of a second prefabricated section 13 by means of the continuous field weld 46. Thus, it will be noted that with my novel arrangement, the bus 10 is completely enclosed by means of the enclosures 26 and 44 as well as rings 11 and 12 and will be water-tight without the necessity of gaskets. The entire structure will be welded together so that the bus run will be water-tight.

A completed installation utilizing the prefabricated sections as shown in Figures 1 and 2 is illustrated in Figure 5 wherein the lower left-hand of the bus run is connected to a generator 46 and two outlets of the bus run are connected to transformers 47 and 48.

Thus, as illustrated, the prefabricated sections and method of joining, as illustrated in Figures 1 and 2, can effectively be applied to an installation where there are both vertical and horizontal runs as well as elbow and T connections, as shown in Figure 5.

In the event it is desired to either inspect or replace the insulators 15 after the entire structure has been assembled, then it will be necessary to burn away a portion of the enclosure 44 to make the repairs or inspection. That is, by means of a blow-torch, a section of the enclosure 44 can be burned away in the form of a hand hole for ready access to the internal portion of the enclosure. After the necessary repairs and inspection have been made, the removed section can then be welded back into place to again insure a water-tight connection.

In those installations where a more readily removable hand hole is desired, an arrangement shown in Figure 6 may be utilized. That is, on the enclosure 44, an opening in the form of a hand hole 50 is provided.

Aluminum strips 51 and 52 can be continuously factory welded at 53 around the edges of the hand hole 50 to the enclosure 44. A thick aluminum cover 54, having the general configuration of the enclosure 44, is then positioned on top of the strip 51 and secured thereto by means of a screw arrangement 55. It will be noted that in this arrangement, it will be necessary to provide gasket means 56 positioned between the strip 53 and the cover 54 in order to make this section water-tight.

Thus, in the preferred arrangement, where it is desirable to have the enclosure water-proof, the hand hole arrangement of Figure 6 would not be used. However, in other installations where the risk can be taken of the possibility of moisture leaking through a gasket, the arrangement of Figure 6 can be used so that a hand-hole is readily available merely by removing a plurality of screws 55.

Thus, in summary, I have provided a novel isolated phase bus structure wherein each phase of the bus is electrically isolated from the other phase and each bus in turn is provided with an enclosure which is entirely welded.

Furthermore, the arrangement is such that sections can be prefabricated and thereafter assembled at the field or point of installation with relative ease so that the assembled unit is watertight. In addition, the welded enclosed structure is provided with bellows to provide the required compensation due to the expansion and contraction of the structure.

My novel arrangement also provides means to relieve the bellows of undue mechanical strain and also lend the necessary rigidity and strength to the enclosure at the point where they are coupled to the bellows.

This arrangement is also provided with an insulating means which prevents the circulation of currents in the bellows.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In an isolated phase bus structure comprised of a plurality of prefabricated sections; each of said prefabricated sections being comprised of a first and second supporting ring, a housing section, a bus and supporting insulators; said first and second supporting rings being parallel to each other and positioned along the axis of said bus; supporting insulators positioned in the plane of said first and second supporting rings to mechanically support said bus; a housing section having a first end factory welded along the circumference thereof to said first supporting ring and a second end factory welded to said second supporting ring; each of said housing sections being comprised of a first and second portion coupled together by a flexible bellows; said bellows positioned concentric to said bus to compensate for expansion and contraction of said housing section; one end of said bellows factory welded to said first portion of said housing section and the other end of said bellows factory welded to said second portion of said housing section; a stiffener piece having substantially the same configuration as said first and second portion of said housing section; one end of said stiffener piece factory welded to said first portion of said housing section; the other end of said stiffener piece having insulation secured thereto; said insulation being in a sliding relationship with said second portion of said housing section; said stiffener piece effective to add rigidity and reinforcement to said housing and relieve said bellows of mechanical strain; an enclosure positioned concentric to said bus and positioned between adjacent prefabricated sections; said enclosure being field welded along the circumference of one end to said second supporting ring of a first prefabricated section and field welded along the circumference of a second end to a first structural ring in a second prefabricated section; said prefabricated sections and said enclosures comprising a completed welded enclosure for said busbar to thereby render said isolated phase bus structure water-tight.

2. In an isolated phase bus structure being comprised of a plurality of prefabricated sections; each of said prefabricated sections being comprised of a first and second supporting ring and an enclosure; said enclosure being comprised of a first and second section coupled together by a bellows; said first section of said enclosure factory welded along the circumference thereof to said first supporting ring; said second section of said enclosure being factory welded along the circumference thereof to said second supporting ring; one end of said bellows factory welded to said first section of said enclosure and the other end of said bellows factory welded to the second portion of said enclosure; a stiffener piece having substantially the same configuration as said first and second portion of said enclosure; one end of said stiffener piece factory welded to said first portion of said enclosure; the other end of said stiffening piece having insulation secured thereto; said insulation positioned between said stiffener piece and said second portion of said enclosure; said insulation preventing a circulation of current through said bellows.

3. In an isolated phase bus structure being comprised of a plurality of prefabricated sections; each of said prefabricated sections being comprised of a first and second supporting ring and an enclosure; said enclosure being comprised of a first and second section coupled together by a bellows; said first section of said enclosure factory welded along the circumference thereof to said first supporting ring; said second section of said enclosure being factory welded along the circumference thereof to said second supporting ring; one end of said bellows factory welded to said first section of said enclosure and the other end of said bellows factory welded to the second portion of said enclosure; a stiffener piece having substantially the same configuration as said first and second portion of said enclosure; one end of said stiffener piece factory welded to said first portion of said enclosure; the other end of said stiffening piece having insulation secured thereto; said insulation positioned between said stiffener piece and said second portion of said enclosure said insulation preventing a circulation of current through said bellows; said stiffener piece and said insulation providing a slip joint for said second portion of said enclosure; said stiffener piece effective to add rigidity and reinforcement to said enclosure and relieve said bellows of mechanical strain.

References Cited in the file of this patent

UNITED STATES PATENTS

| Re. 23,811 | Scott | Mar. 30, 1954 |
| 409,183 | Ferranti | Aug. 20, 1889 |
| 2,275,203 | Rudd | Mar. 3, 1942 |
| 2,647,940 | Swerdlow et al. | Aug. 4, 1953 |
| 2,706,744 | Rudd | Apr. 19, 1955 |
| 2,784,012 | Killian et al. | Mar. 5 1957 |

FOREIGN PATENTS

| 474,381 | Great Britain | Dec. 11, 1936 |